(12) United States Patent
Warsop et al.

(10) Patent No.: US 10,556,671 B2
(45) Date of Patent: Feb. 11, 2020

(54) TILE ASSEMBLY

(71) Applicant: BAE SYSTEMS PLC, London (GB)

(72) Inventors: Clyde Warsop, Bristol (GB); Nisar Ahmed Mirza, Rochester (GB)

(73) Assignee: BAE Systems plc, London (GB)

( * ) Notice: Subject to any disclaimer, the term of this patent is extended or adjusted under 35 U.S.C. 154(b) by 556 days.

(21) Appl. No.: 15/106,859

(22) PCT Filed: Dec. 22, 2014

(86) PCT No.: PCT/EP2014/079019
§ 371 (c)(1),
(2) Date: Jun. 21, 2016

(87) PCT Pub. No.: WO2015/097164
PCT Pub. Date: Jul. 2, 2015

(65) Prior Publication Data
US 2017/0001715 A1   Jan. 5, 2017

(30) Foreign Application Priority Data

Dec. 24, 2013   (EP) ..................................... 13275337
Dec. 24, 2013   (GB) ..................................... 1322997.6

(51) Int. Cl.
*B64C 21/08*   (2006.01)
*B64C 21/02*   (2006.01)
(Continued)

(52) U.S. Cl.
CPC ................ *B64C 21/08* (2013.01); *B63B 1/32* (2013.01); *B63G 8/00* (2013.01); *B64C 21/02* (2013.01);
(Continued)

(58) Field of Classification Search
CPC ..... B64C 21/08; B64C 21/02; B64C 2230/16; B64C 2230/22; B64C 2230/18;
(Continued)

(56) References Cited

U.S. PATENT DOCUMENTS 3,194,518 A * 7/1965 Walsh .................. B64C 21/025
                                                    244/130
3,203,648 A * 8/1965 Vanesian ................. B64C 21/06
                                                    244/209
(Continued)

FOREIGN PATENT DOCUMENTS

DE   102004011017 A1   9/2005
GB        653854 A     5/1951
(Continued)

OTHER PUBLICATIONS

EP Search Report dated May 22, 2014 of Patent Application EP13275337 filed Dec. 24, 2013.
(Continued)

*Primary Examiner* — Valentina Xavier
(74) *Attorney, Agent, or Firm* — Maine Cernota & Rardin (57) ABSTRACT

A tile assembly (22) which, in use, is fitted to a base structure to form at least part of a fluid washed surface. The tile assembly comprises a housing (42) with at least one plenum (45) being provided within the housing (42). A wall (44) of the housing (42) is provided with a plurality of flow passages (46) which extend from the plenum side of the wall (44) to an outer surface (48) of the wall. Flow passage closures (50) are provided which are operable to open and close at least some of the flow passages (46).

33 Claims, 6 Drawing Sheets

(51) Int. Cl.
   *B63B 1/32* (2006.01)
   *B63G 8/00* (2006.01)
(52) U.S. Cl.
   CPC ...... *B64C 2230/04* (2013.01); *B64C 2230/16* (2013.01); *B64C 2230/18* (2013.01); *B64C 2230/22* (2013.01); *Y02T 50/166* (2013.01)
(58) Field of Classification Search
   CPC ......... B64C 2230/04; B63G 8/00; B63B 1/32; Y02T 50/166
   See application file for complete search history.

(56) References Cited

U.S. PATENT DOCUMENTS

| | | | |
|---|---|---|---|
| 3,774,867 A | 11/1973 | Quinn | |
| 3,948,469 A * | 4/1976 | Brown | B64D 27/18 244/54 |
| 4,219,894 A | 9/1980 | Jakowicki | |
| 5,791,275 A | 8/1998 | Bandyopadhyay | |
| 5,934,611 A * | 8/1999 | Tindell | B64C 21/025 181/214 |
| 6,131,855 A * | 10/2000 | Porte | B64D 15/04 244/134 B |
| 6,142,425 A * | 11/2000 | Armanios | B64C 9/38 239/562 |
| 8,282,037 B2 * | 10/2012 | Jain | B64D 29/00 244/207 |
| 9,758,240 B2 * | 9/2017 | Brown | B64C 21/06 |
| 2002/0179777 A1 | 12/2002 | Al-Gami | |
| 2007/0051855 A1 | 3/2007 | Shmilovich | |
| 2012/0026691 A1 * | 2/2012 | Campbell | H05K 7/20781 361/700 |
| 2016/0311520 A1 * | 10/2016 | Khidekel | B64C 7/02 |
| 2018/0244127 A1 * | 8/2018 | Sennoun | B60H 1/00342 |

FOREIGN PATENT DOCUMENTS

| | | |
|---|---|---|
| WO | 106134 A1 | 1/2001 |
| WO | 2006105174 A2 | 10/2006 |
| WO | 2008136697 A1 | 11/2008 |

OTHER PUBLICATIONS

GB Search Report dated Jul. 22, 2014 of Patent Application GB1322997.6 filed Dec. 24, 2013.
PCT Search Report dated Feb. 26, 2015 of Patent Application PCT/EP2014/079019 filed Dec. 22, 2014.
International Preliminary Report on Patentability and Written Opinion dated Jun. 28, 2016 of PCT/EP2014/079019 filed Dec. 22, 2014.
Combined Search & Exam Report under Sections 17 and 18(3) dated May 28, 2015 of Application No. GB1422941.3, 5 pages.

* cited by examiner

TILE ASSEMBLY

RELATED APPLICATIONS

This application is a national phase application filed under 35 USC § 371 of PCT Application No. PCT/EP2014/079019 with an International filing date of Dec. 22, 2014, which claims priority of EP Patent Application 13275337.7 filed Dec. 24, 2013 and GB Patent Application 1322997.6 filed Dec. 24, 2013. Each of these applications is herein incorporated by reference in its entirety for all purposes.

FIELD OF THE INVENTION

The present disclosure relates to a tile assembly.

In particular, it relates to a tile assembly which, in use, forms at least part of a fluid washed surface.

BACKGROUND

Discontinuities in the surfaces of aerodynamic bodies, such as an aircraft wings and fuselage, can lead to boundary layer thickening, flow separation or breakdown of the airflow passing over them, resulting in lift reduction, and hence in a decreased fuel efficiency. Discontinuities may be features extending above or below the surface of the aerodynamic surface, or unfavourable curvatures which result in severe adverse pressure gradients.

Likewise, similar discontinuities on the surface of marine vehicles, such as the outer hulls of submarines, boats and ships, can result in increased resistance to motion of the vehicle as it passes through water, resulting in a lower achievable speed for a given fuel efficiency.

Where the discontinuities are generated by moveable control surfaces, for example on a rudder or the moveable slats at the leading edge of a wing, the fluid flow downstream of the discontinuity may become significantly disrupted, which at some fluid flow conditions, or rudder and slat angles, may additionally compromise the effectiveness of the moveable control surfaces.

Hence a means for preventing separation of flow or creating a modified boundary layer on fluid washed surfaces is highly desirable.

SUMMARY

Accordingly there is provided a tile assembly which, in use, is fitted to a base structure to form at least part of a fluid washed surface; the tile assembly comprising: a housing; at least one plenum being provided within the housing; a wall of the housing provided with a plurality of flow passages which extend from the plenum side of the wall to the outer surface of the wall; and flow passage closures operable to open and close at least some of the flow passages.

The housing may be provided with a mechanical fixing for cooperation with a complementary fixing on the base structure to thereby lock the tile assembly to the base structure.

The mechanical fixings may be configured to be disengagable such that the tile assembly may be removed from the base structure.

The tile assembly may further comprise a dedicated fluid supply for the delivery of a fluid supply to the plenum.

There may be provided a duct located in a wall of the housing for the delivery of a fluid supply to the plenum. The duct may comprise a fluid coupling for engagement with a complementary fluid coupling on the base structure.

The housing may be configured to maintain a pressure difference of up to about 5 bar between the fluid in the plenum and the static pressure of the fluid flow over the outer surface of the housing wall. Alternatively the housing may be configured to maintain a pressure difference of up to about 2 bar between the fluid in the plenum and the static pressure of the fluid flow over the outer surface of the housing wall.

The flow passage closures may be coupled to actuators which are operable to open and close the closures. At least some of the actuators may be piezo-electric actuators. At least some of the actuators may be operable to open and close their respective closures independently of the others. At least some of the actuators may be operable to open and close their respective closures at the same time as each other.

The tile assembly may further comprise a control unit operable to send a control signal to the or each of the actuators.

The tile assembly may further comprise a fluid flow sensor to measure fluid flow over the wall of the housing comprising the flow passages and generate a signal indicative of fluid flow for communication to the control unit.

The control unit may be operable to:
a. receive a signal from the fluid flow sensor; and
b. control the actuators in dependence upon the signal from the fluid flow sensor.

The control unit may be operable to:
a. determine the operational capability of the actuators;
b. generate a signal for reporting the operational capability of the actuators.

The control unit may be operable to control the actuators to intermittently open and close the closures to thereby provide a pulsed flow through the fluid passages. The control unit may be operable to receive activation and deactivation signals from a command unit external to the tile assembly. The command unit may be one of a parent control system or direct operator.

The parent control system and control unit may be in communication via a bi directional digital data bus or by wireless communication. The tile assembly may further comprise a dedicated electrical power supply, the control unit being in electrically conductive communication with the dedicated electrical power supply.

An electrical socket may be provided on a wall of the housing for engagement with a complementary coupling on the base structure, the control unit being in electrically conductive communication with the electrical socket.

The flow passages may comprise elongate slots which extend at an angle to the direction of flow of fluid over the fluid washed surface. The flow passages may be substantially circular or oval in cross section, and have a central axis perpendicular to, or at an angle to, the fluid washed surface. At least some of the central axes of the flow passages may be parallel with one another. At least some of the central axes of the flow passages may be at an angle to one another. There may also be provided a structure having a fluid washed surface comprising a tile assembly of the present disclosure, and a base structure.

The base structure may be provided with more than one tile assembly, and there may be provided a primary fluid supply for the supply of fluid to the plenum of each tile assembly, and there may also be provided a secondary fluid supply for the supply of additional fluid to the plenum as required.

The tile assembly may be located in a leading edge region of the base structure.

The base structure may comprise at least part of: an aircraft wing structure and/or aircraft fuselage; an outer hull of a water based vehicle such as a ship or submarine; or a fluid flow duct.

Hence there is provided an active flow control system comprising a tile assembly and a structure comprising a tile assembly which is configured to provide controlled fluid flow on its surface to prevent separation of flow on or downstream of the tile assembly, and hence increase efficiency, and in some circumstances controllability, of the device to which the assembly is fitted to.

BRIEF DESCRIPTION OF THE DRAWINGS

Examples of the present disclosure will now be described with reference to the accompanying drawings, in which.

DETAILED DESCRIPTION

Figure 1:
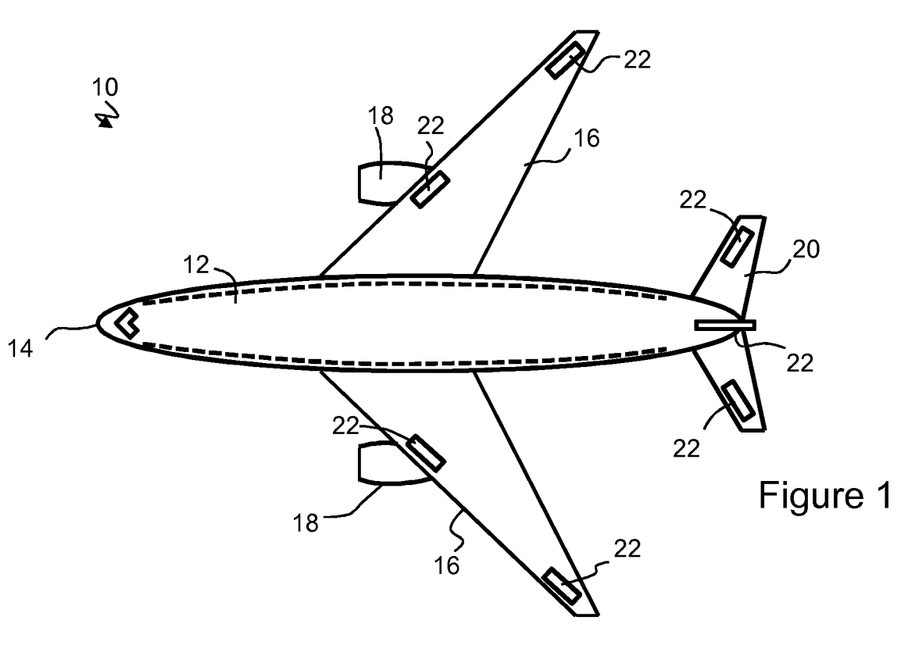
FIG. 1 and FIG. 2 show a plan and underside view respectively of an aircraft body with a tile assembly according to the present disclosure shown in different locations.
Figure 2:
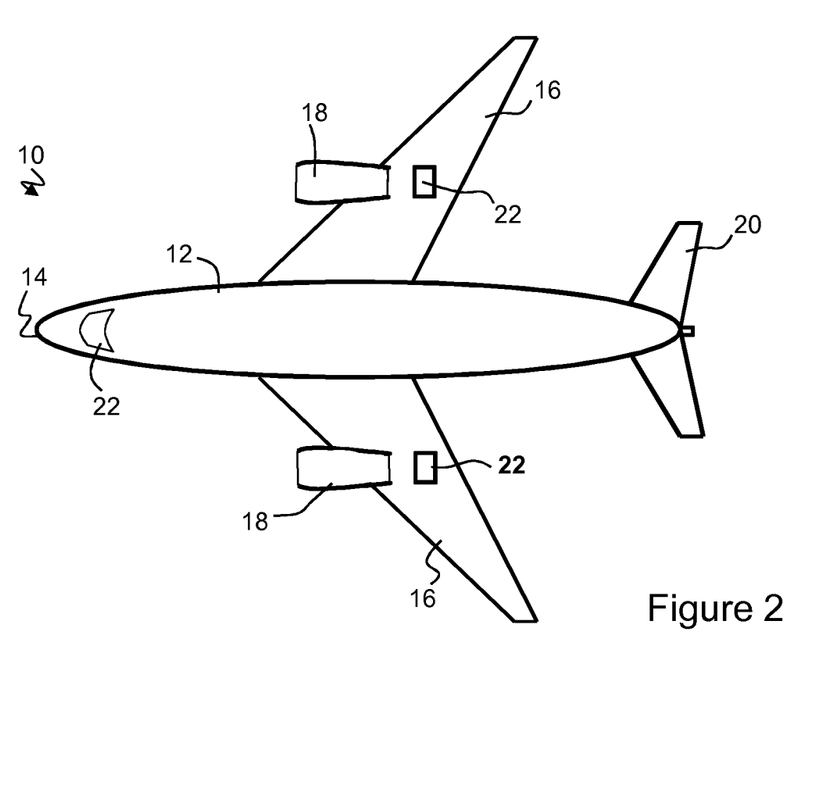

FIG. 1 and FIG. 2 show a plan view and underside view respectively of an aircraft 10 comprising the device of the present disclosure. The aircraft 10 comprises a fuselage 12 having a nose (leading edge) 14, wings 16, engines 18 carried on the wings 16, and an empennage 20. A tile assembly 22 of the present disclosure is provided in at least one location on the aircraft 10. In FIG. 1 a tile assembly 22 is shown provided at the tips of the wings 16, at the tips of the tail fin and flaps of the empennage 20. Tile assemblies 22 may also be provided on the top surface of the wing 16 above and to either side of the engine pylons (where the pylons are provided on the underside of the wing 16, extending between the wing 16 and the engine 18). In FIG. 2 the tile assembly 22 is shown just downstream of the nose 14 of the fuselage 12, and on the wings downstream of the engines 18. The tile assembly 22 of the present disclosure may be provided in all or just some of these locations, or in alternative or additional locations on the aircraft 10, for example on the wing leading edge or wing trailing edge control surfaces.

Figure 3:
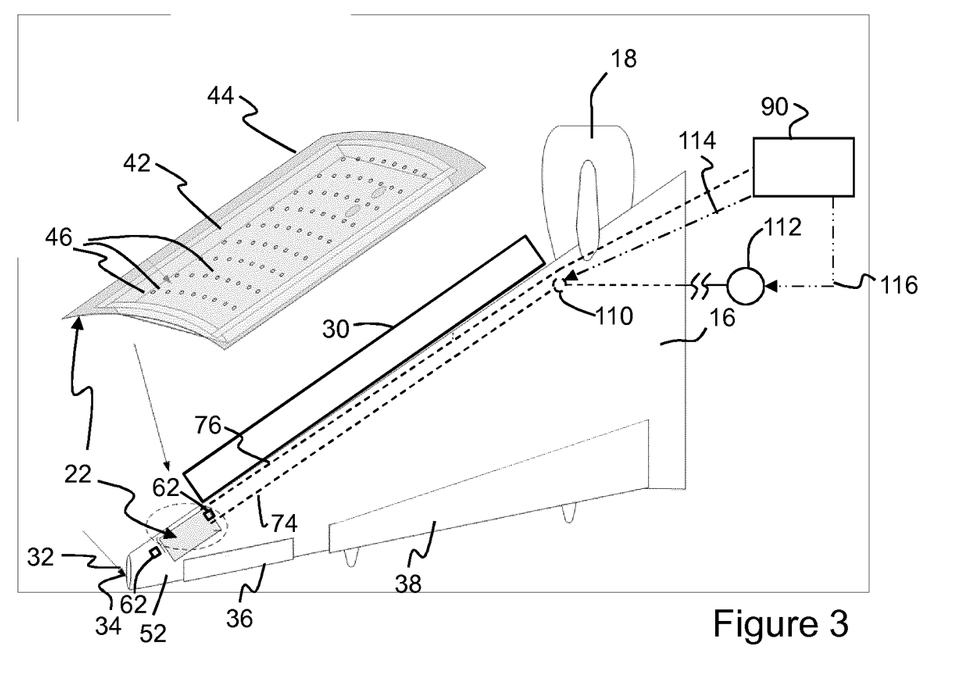
FIG. 3 shows an enlarged view of the tile assembly and a wing section of the aircraft of FIGS. 1 and 2.
Figure 4:
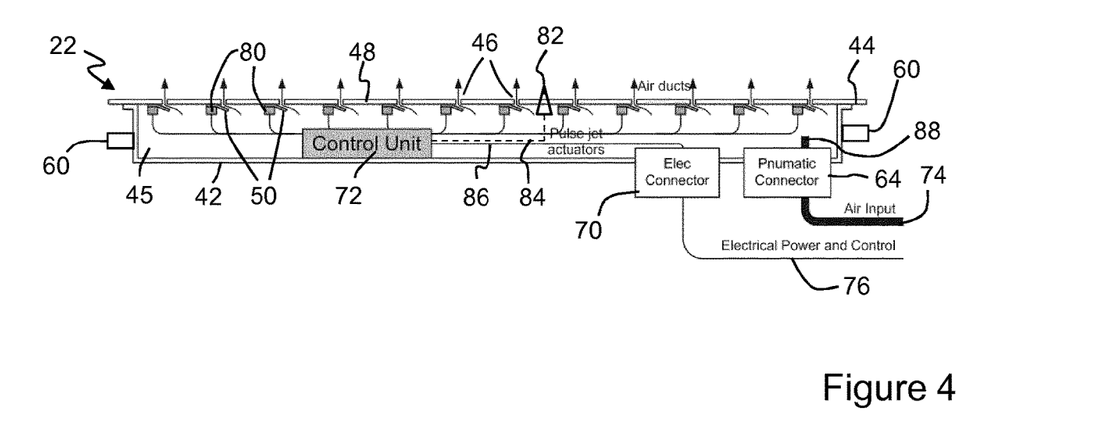
FIG. 4 is a cross sectional view of the tile assembly shown in FIG. 3 which shows an example of the internal construction of the tile assembly.
Figure 5:
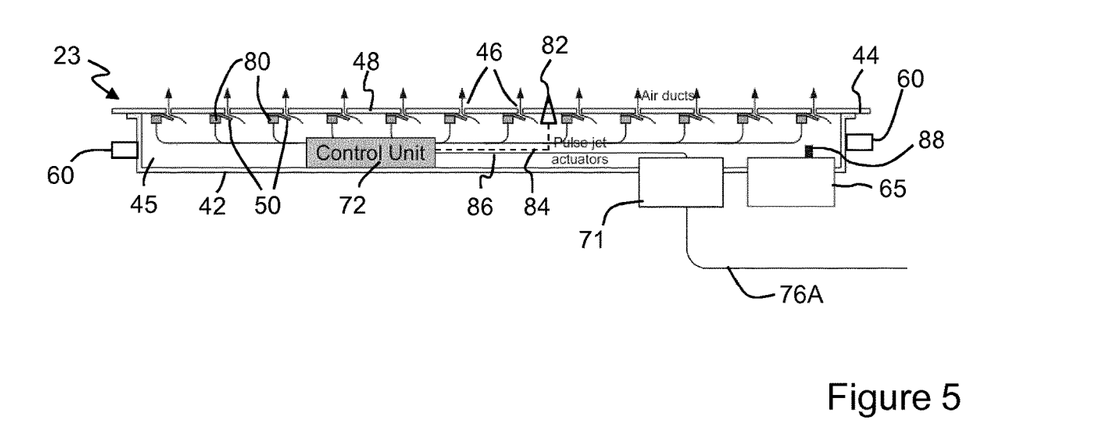
FIG. 5 is a cross sectional view of an alternative tile assembly configuration to that shown in FIG. 4.

In FIGS. 3, 4, 5 the tile assembly 22 is shown in more detail. In FIG. 3 the tile assembly 22 is shown located on a wing 16 of the aircraft 10 relative to a number of other wing features. A slat 30 for the control of the aircraft extends forwards of the leading edge of the wing 16. In the example shown, the slat 30 is located on the wing leading edge between the engine and wing tip 32, where there may be provided a winglet 34. An aileron 36 is provided on the trailing edge of the wing 16 towards the wing tip 32. A flap 38 is provided on the trailing edge of the wing 16 between the wing tip and the fuselage 12. In the example shown, the tile assembly 22 is provided at the leading edge of the wing 16 between the slat 30 and the wing tip 32. The tile assembly 22 may also be provided in alternative and additional locations. FIG. 3 also shows an enlarged view of the tile assembly 20 which will be used in conjunction with the cross sectional view shown in FIG. 4 to describe the tile assembly 22 in more detail.

In this context, "leading edge" is taken to mean the nominal "front" part of a structure 52 (that is to say, the part of the structure the fluid flow first meets as it passes over the structure 52), and "trailing edge" is taken to mean the nominal "back/rear" part of a structure 52 (that is to say, the last part of the structure the fluid flow is in contact with as it passes over the structure 52).

The tile assembly 22 is provided as a standalone unit, and comprises a housing 42, wherein the housing 42 comprises a wall 44 which in use is a fluid washed surface 48. That is to say, the outer surface 48 of wall 44 forms part of the outer surface of the wing 16 such that the wall 44 (i.e. surface 48) conforms with, and is a continuation of, the surface of the outer skin of the wing 16. The housing 42 and wall 44 define at least one plenum 45 within the housing 42. The wall 44 is provided with a plurality of flow passages 46 which extend from the plenum 45 side of the wall 44 to the outer surface 48 of the wall 44. Flow passage closures 50 are provided on the wall 44, and are operable to open and close at least some of the flow passages 46.

The housing 42 is provided with a mechanical fixing 60 for cooperation with a complementary fixing 62 on the wing base structure 16, 52 and thereby lock the tile assembly 22 to the base structure 52. The mechanical fixings 60, 62 may be of any appropriate type for locating and engaging the tile assembly 22 on the base structure 52. The mechanical fixings 60, 62 are configured to be disengageable such that the tile assembly 22 may be removed from the base structure 52, for example to carry out repairs to components mounted inside the tile assembly 22, or to replace the entire tile assembly 22 unit.

There is provided a duct 64 located in a wall of the housing 42 for the delivery of a fluid supply to the plenum 45. The duct 64 comprises a fluid coupling for engagement with a complementary fluid coupling that extends from the base structure 52. The fluid coupling 64 has an outlet 88 on the inside of the plenum 45 for delivering fluid to the plenum 45. The coupling 64 may be of any suitable kind which is engageable and disengageable and provides a fluid tight seal for the delivery of air or other fluid to the plenum 45. Details of the fluid connector are not shown in FIG. 4, details of such fluid connectors being well known in the art.

An electrical socket 70 is also provided on a wall of the housing 42 for engagement with a complementary coupling on the base structure 52. Details of the electrical socket 70 are not shown, such being common and well known in the art. The electrical socket 70 is in electrically conductive communication with a tile assembly control unit 72 described below. A pipe 74 leads to the fluid connector 64 from a fluid supply in the aircraft. Likewise an electrical power and control cable 76 leads to the electrical connector 70 from a command unit 90 external to the tile assembly 22, on board the aircraft 10. The control unit 72 is supplied by electricity from the electrical connector 70 via a line 86.

The command unit 90 may be in communication with all of the tile assemblies on the base structure 52, or just one or some of them. The command unit 90 is also in communication with supplies of fluid to the tile assembly 22, and operable to direct the fluid supplies (110,112 described below) to deliver fluid to the tile assemblies 22.

The electrical connector 70 and fluid connector 64 are configured to be coupled and decoupled easily from the base structure 52. The couplings 64, 70, may be mounted on either the side or underside of the housing 42 whichever is the most convenient for installation.

The structure of the plenum 45 defined by the housing 42 is such that the only exit for fluid is via the flow passages 46. Other than the flow passages 46, the housing 42 is a fluid tight structure which is configured to maintain a pressure difference between fluid in the plenum 45 and the static pressure of the fluid flow over the outer wall 44. In one example the housing 42 is configured to maintain a pressure difference of up to about 5 bar. In an alternative example, the housing 42 is configured to maintain a pressure difference of up to about 2 bar. The pressure difference configuration is chosen in dependence upon the application of the tile assembly. For example, it may be advantageous for the tile assembly to be configured to maintain a relatively high pressure difference when operating in a high flow (e.g. supersonic) environment, for example when fitted to a supersonic aircraft. Hence with the flow passages 46 open or closed, a desired pressure may be maintained in the plenum 45.

The flow passage closures 50 are coupled to actuators 80 which are operable to open and close the closures 50. The actuators 80 may be piezo electric actuators. Other types of actuators may additionally or alternatively be used instead of piezo electric actuators. At least some of the actuators 80 are operable to open and close the closures 50, and hence the flow passages 46, independently of the others. That is to say, at least some of the actuators 80 may open and close their respective closures 50 at different times to other actuators 80. Additionally, or alternatively, some of the actuators 80 are operable to open and close their respective closures 50 at the same time as each other. The control unit 72 is operable to send a control signal to the, or each, of the actuators 80.

The control unit 72 may also be operable to control the actuators to intermittently open and close the closures 50 to thereby provide a pulsed flow through the fluid passages.

The tile assembly 22 may further comprise a fluid flow sensor 82 to measure fluid flow over the outer wall 44 for the housing, i.e. the surface 48, and generate a signal indicative of fluid flow for communication to the control unit 72. A diagrammatic representation of the fluid flow sensor 82 is shown in FIG. 4, where it is embedded in the wall 44. The fluid flow sensor 82 is configured to distinguish between laminar and turbulent fluid flow. Any suitable fluid flow sensor may be used in this application. The signal generated by the fluid sensor 82 is used by the control unit 72 to determine if the actuator closure mechanisms are required or operating effectively to provide the required performance. Put another way, the control unit 72 is operable to receive a signal from the fluid flow sensor 82 via a line 84, or wireless communication, and control the actuators 80 in dependence upon the signal from the fluid flow sensor 82.

The control unit 72 is operable to determine the operational capability of the actuators 80. That is to say, to determine whether they are opening and closing the closures 50. The control unit 72 may also be operable to generate a signal for reporting the operational capability of the actuators 80, where the report may take the form of a recorded log for downloading from the control unit, or be communicated to the command unit 90 on board the aircraft, external to the tile assembly 22.

The control unit 72 is operable to receive activation and deactivation signals from the command unit 90. The command unit 90 may be one of a parent control system on board the aircraft or a direct operator (i.e. a pilot). The command unit 90 and control unit 72 may be in communication via a directional digital data bus or by wireless communication.

The tile assembly 22 is self-contained, and takes electrical and fluid sources from the vehicle to which it is attached.

An alternative example tile assembly 23 according to the present invention is shown in FIG. 5. In all respects it is the same as the example shown in FIG. 4, and may be employed in the same locations and applications as the previously described tile assembly 22. Features common to the previous example are labelled with the same reference numerals. Tile assembly 23 differs from tile assembly 22 in that, instead of a connection 74 to an air/fluid supply, the tile assembly 23 has only a dedicated fluid source 65, from which is provided an outlet 88. The fluid source may be a pressurised fluid (such as air) or a dedicated compressor. Additionally, or alternatively, the tile assembly 23 may have its own electrical power source 71, such as a battery, fuel cell or motor. A line 76A may be provided for communication with the command unit 90, and/or to provide additional or back up electrical power should the dedicated power source 71 fail or need supplementing. In this example, there is no need for a connection to an external fluid and/or electrical supply, and hence the features herein described in relation to FIGS. 3,4 to connect the tile assembly 22 to external fluid sources and external power sources are not required.

Figure 6:
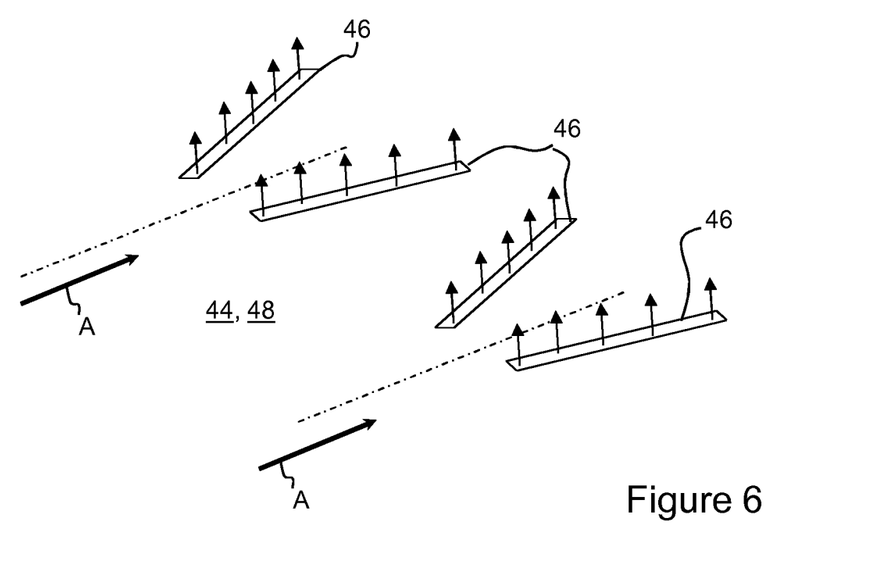
FIG. 6 shows detail of the flow passages of the tile assembly of the present disclosure.
Figure 7:
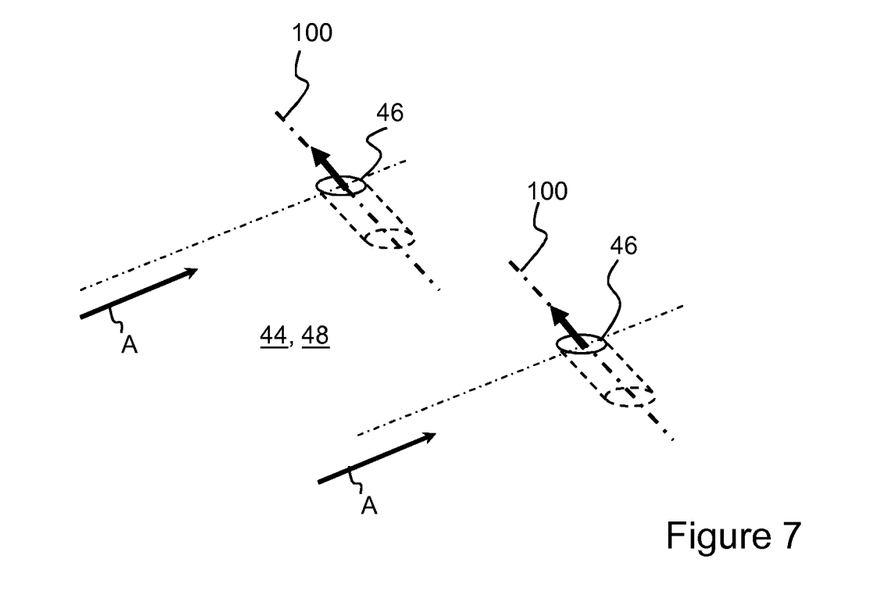
FIG. 7 shows flow passages of a different geometry and orientation to the example of FIG. 6.
Figure 8:
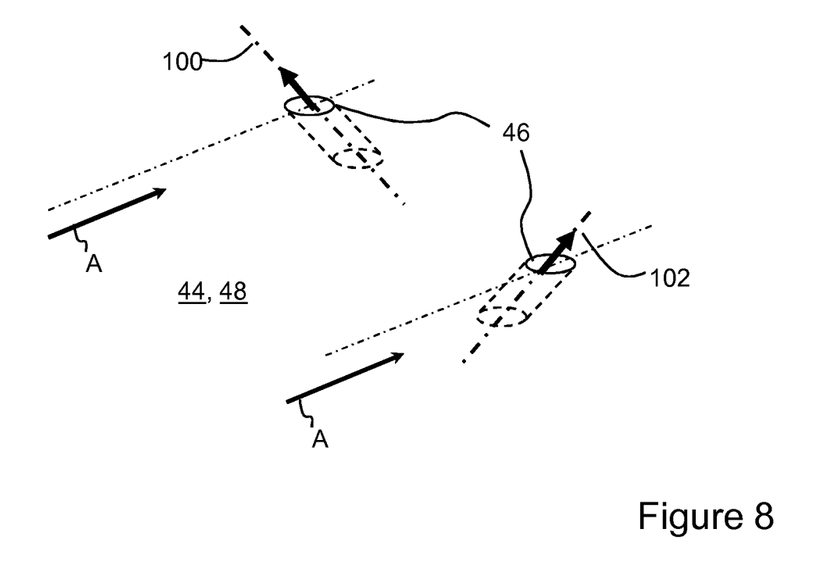
FIG. 8 shows a further alternative geometry for the flow passages of the tile assembly.

FIGS. 6 to 8 show examples of different geometries of flow passages 46 in the tile assembly outer wall 44.

In the example of FIG. 6, the flow passages 46 comprise elongate slots which extend at an angle to the direction of flow of fluid over the fluid washed surface 48, where the direction of flow of fluid is indicated by arrow A.

In another example, the slots may be provided spanwise defining a flow direction normal to the direction of fluid flow A, at an angle to the direction of fluid flow A either facing the flow, or in same direction of flow, or tangential (i.e. aligned) with the direction of fluid flow A either facing the flow, or in same direction of flow.

In an alternative example shown in FIG. 7, the flow passages 46 are substantially circular or oval in cross section, and have a central axis 100 perpendicular to, or at an angle to, the outer surface of the fluid washed surface 48. The central axes 100 of at least some of the flow passages 46 may be parallel with one another.

The flow passages 46 may also be arranged as shown in FIG. 8, where some of the flow passages 46 have a central axis 100 at one angle to the fluid washed surface 48, and another of the fluid passages 46 is shown with a central axis 102 at a different angle to the fluid washed surface 44. That is to say, some of flow passages 46 have central axes which are at an angle to one another.

As discussed above, the base structure 52 (i.e. in this example, the aircraft 10 or the wing 16) may be provided with more than one tile assembly 22,23. As shown in FIG. 3, there may be provided a primary fluid supply 110 for the supply of fluid to the plenum 45 of each tile assembly 22, and there may also be provided a secondary fluid supply 112 for the supply of additional fluid to the plenum 45 as required. The primary fluid supply 110 may be derived from one of the engines 18 as shown in FIG. 3, in which a line 74 extends from the tile assembly 22 to a node/valve on the engine 18 where a supply of fluid may be extracted. The secondary fluid supply 112 may be from elsewhere on the aircraft 10, for example another main engine 18.

Alternatively the primary fluid supply 110 may be a small dedicated compressor. The secondary fluid supply 112 may also be a small dedicated compressor. Each tile assembly 22,23 may be in communication with its own fluid supply (e.g. compressor), or each fluid supply 110, 112 may supply fluid to a number of tile assemblies 22. As the tile assemblies are not necessarily required to be operational at all conditions, not all of the fluid supplies will be required all of the time. That is to say, some of the fluid supply compressors may be turned off for some operational conditions, but will be required to supply sufficient fluid to the tile assemblies 22 at other conditions.

The command unit 90 is operable to instruct the delivery of fluid from the fluid supplies 110,112 to the tile assembly 22. In the case where the fluid supply is an engine 18, this may involve the command unit 90 instructing a valve to open to allow air to flow from a compressor section of the engine 18 to the tile assembly 22 via command lines 114,116. In the case where the fluid supply is a dedicated compressor, the command unit may instruct the compressor to operate and hence compress and deliver air to the tile assembly via lines 74.

In the example of an aircraft, the term "fluid" relates to air that aircraft 10 travels through. For the avoidance of doubt, and in relation to other examples, "fluid" may also be taken to mean either a gas or liquid.

Figure 9:
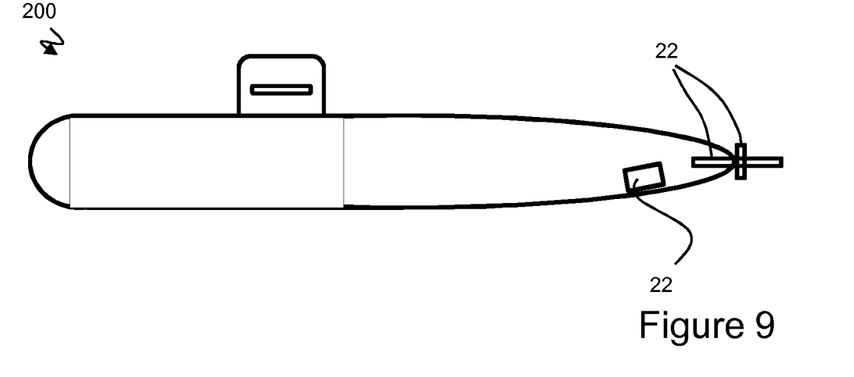
FIG. 9 shows a submarine with tile assemblies according to the present disclosure in various locations.
Figure 10:
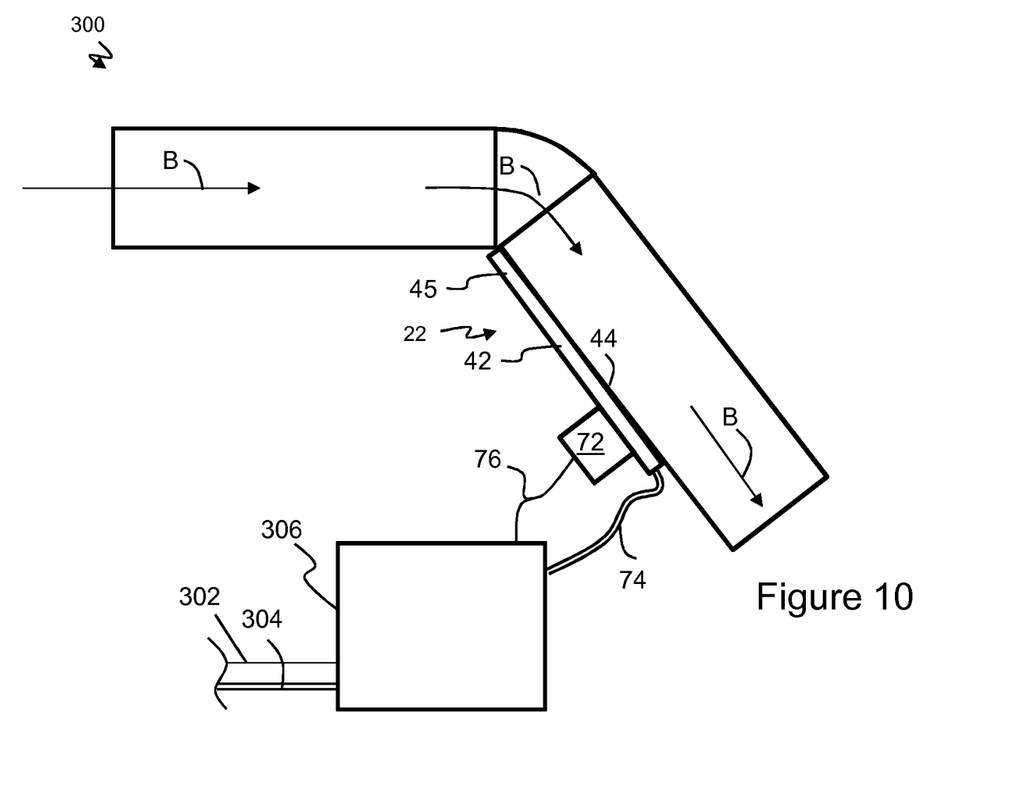
FIG. 10 shows a flow duct with a tile assembly according to the present disclosure.

As shown in FIGS. 9 and 10, the tile assembly of the present disclosure may also be applied to other applications, for example the outer hull of a marine vehicle such as a ship or submarine 200. For a submarine, the tile assembly of the present disclosure may be placed on the hull afterbody, on a fin or fore plane/aft planes.

Additionally the tile assembly of the present disclosure may also be applied to a fluid flow duct 300 as shown in FIG. 10. In FIGS. 9 and 10, reference numerals referring to features common to the examples shown in the preceding figures share common reference numerals.

In the example of the submarine 200, the tile assembly works as discussed above, except that the working fluid is water rather than air.

For the example of the fluid duct 300, the working fluid may be air, water, or other liquid or gas flowing in the pipe depending on the duct's application, but other than that it is identical to that of the examples shown in FIGS. 1 to 8. With reference to the example of FIG. 10, the control unit 72 is fed by a power line 76, and the plenum 45 is fed by a fluid supply 74. The power supply 76 and fluid supply 74 are in communication with a hub 306 for the supply of electricity and fluid to other tile assemblies 22, and is itself fed by a master power supply 302 and fluid supply 304 as shown.

With respect to all of the preceding examples, in use the control unit 72 and fluid flow sensor 82 may be turned on in response to an activation signal from the command unit 90. The fluid flow sensor 82 generates a signal indicating the nature of the fluid flow over the tile assembly 22,23. That is to say, the fluid flow sensor 82 indicates whether the fluid flow over the outer surface of the wall 44 of the tile assembly 22,23 is in a laminar or turbulent state, about to separate or has separated. The signal generated by the fluid flow sensor 82 is communicated to the control unit 72. If the flow is laminar and/or attached, the control unit 72 continues to monitor the flow sensor signal.

If the flow is turbulent and/or separated, the control unit 72 sends a signal to the command unit 90, which in turn instructs the delivery of fluid to the plenum 45. For tile assembly 22 this will be via the line 74 and outlet 88. For tile assembly 23, this will be from the dedicated fluid source 65.

Based upon ongoing information provided from the sensor 82, the control unit 72 will operate the actuators 80 to open and close the closures 50 as appropriate to provide jets of fluid from the plenum 45 to the surface 48 of the wall 44. The closures 50 may be opened and closed in unison, some may open and close at different times to others, or they may open and close at a different rate to one another as required. The fluid flow sensor 82 will continue to provide feedback on the condition of the fluid flow passing over the file assembly, and the control unit 72 operates to control the actuators 80 to thereby modify the boundary layer, and hence delay the onset of flow separation from the surface of the tile assembly and further downstream of the tile assembly.

That is to say, the tile assembly is operable to actively modify the external flow over the flow surface to reattach it to the outer surface of the wing, or to maintain contact with the outer surface of the wing.

The actuators 80 and closures 50 act as air jet vortex generators and in operation reduce the effects of flow separation from the fluid washed surface 88 by enhancing boundary layer mixing. The pulsing effect produced by the opening and closing of the closures 50 can give the same benefit as continuous jets exhausted from the flow passages 46. Hence the pulsing of jets with a particular duty cycle (that is to say, the length of time the flow passages 46 are open compared to the length of time that the flow passages 46 are shut) can give the same effectiveness as constant jets, but for a lower fluid mass usage. This provides a saving on the energy required to achieve the desired effect. The exact pulsing frequencies required of the actuators vary according to the flow conditions.

The air-jet vortex generators (i.e. actuators/apertures) may be located ahead (i.e. upstream) of the flow separation point. Additionally and alternatively, the actuators/apertures may be placed at the point of flow separation or in the separated region itself. In this latter example, operation of the jets at an appropriate frequency causes them to interact with the naturally occurring shear-layer instabilities in the separated flow, resulting in the generation of spanwise vortical fluid "structures" that reattach the separated flow.

The control unit 72 also may also be operable to monitor the performance of the actuators and closure assemblies 50,80, the flow sensor 82 and other electronics hardware. This self-test capability can be invoked on power up or on demand and will report health of the tile assembly 22,23 as well as diagnostic information on the source of any failure.

Hence there is provided a means for reducing local flow separation which may be applied to areas of fluid washed surfaces, for example the wing structure or fuselage of an aircraft, a marine vessel (such as a submarine or ship) or a fluid duct. In the example of the aircraft 10, this maintains lift and the effectiveness of the moveable control surfaces (e.g. slats). For the marine vessel 200 example, this reduces the amount of thrust required to move the vessel through water to achieve a desired speed. For the fluid duct 300 application, this reduces the amount of energy supplied to pump fluid along the duct.

The arrangement of the present invention may be customised with the right external profile and in size to fit the external surface of any part of the base structure, for example curved surfaces on a wing surface around engine pylons.

The tile assembly of the present disclosure thus provides an active flow control system which is a standalone line replaceable unit which can be easily installed and removed from a 'cut out' section of a base structure (e.g. aircraft, marine vessel or fluid duct).

The device of the present disclosure is robust in operation, easy to install on the aircraft, maintainable, requires minimal interaction with aircraft systems and is also affordable.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A tile assembly which, in use, is fitted to a base structure to form at least part of a fluid washed surface; the tile assembly comprising:
    a housing;
    at least one plenum provided within an interior of the housing;
    a wall of the housing having an interior side exposed to said plenum and an outer surface configured to form at least part of the fluid washed surface, the wall being provided with a plurality of flow passages extending from the interior, side of the wall to the outer surface of the wall; and
    a plurality of flow passage closures operable to open and close at least some of the flow passages.

2. A tile assembly as claimed in claim 1 wherein the housing is provided with a mechanical fixing for cooperation with a complementary fixing on the base structure to thereby lock the tile assembly to the base structure.

3. A tile assembly as claimed in claim 2 wherein the mechanical fixing is configured to be dis-engagable, such that the tile assembly may be removed from the base structure.

4. A tile assembly as claimed in claim 1, wherein the tile assembly further comprises a dedicated fluid supply configured to deliver a fluid to the plenum.

5. A tile assembly as claimed claim 1, further comprising a duct located in a wall of the housing and configured for delivery of a fluid to the plenum.

6. A tile assembly as claimed in claim 5, wherein the duct comprises a fluid coupling configured for engagement with a complementary fluid coupling provided on the base structure.

7. A tile assembly as claimed in claim 1, wherein the housing is configured to, in use, maintain a pressure difference of up to about 5 bar between fluid contained in the plenum and a static pressure of a fluid flow over an outer surface of the housing wall.

8. A tile assembly as claimed in claim 1, wherein the flow passage closures are coupled to actuators which are operable to open and close the closures.

9. A tile assembly as claimed in claim 8 wherein at least some of the actuators are piezo-electric actuators.

10. A tile assembly as claimed in claim 8, wherein at least some of the actuators are operable to open and close their respective closures independently of the other actuators.

11. A tile assembly as claimed in claim 8, wherein at least some of the actuators are configured to open and close their respective closures simultaneously.

12. A tile assembly as claimed in claim 8, further comprising a control unit operable to send a control signal to each of the actuators.

13. A tile assembly as claimed in claim 12, further comprising a fluid flow sensor configured to measure a fluid flow over the wall of the housing, to generate a sensor signal that is indicative of the fluid flow, and to communicate the sensor signal to the control unit.

14. A tile assembly as claimed in claim 12, wherein the control unit is operable to:
    a. receive a sensor signal from the fluid flow sensor; and
    b. control the actuators in dependence upon the sensor signal from the fluid flow sensor.

15. A tile assembly as claimed in claim 12, wherein the control unit is operable to:
    a. determine an operational capability of the actuators; and
    b. generate a status signal indicating an operational capability of the actuators.

16. A tile assembly as claimed in claim 12, wherein the control unit is operable to control the actuators to intermittently open and close the closures to thereby provide a pulsed flow of a fluid through the flow passages.

17. A tile assembly as claimed in claim 12, wherein the control unit is operable to receive activation and deactivation signals from a command unit that is external to the tile assembly.

18. A tile assembly as claimed in claim 17 wherein the command unit is a parent control system or a direct operator.

19. A tile assembly as claimed in claim 18 wherein the parent control system and control unit are in communication via a bi directional digital data bus or by wireless communication.

20. A tile assembly as claimed in claim 12, further comprising a dedicated electrical power supply, the control unit being in electrically conductive communication with the dedicated electrical power supply.

21. A tile assembly as claimed in claim 12, wherein an electrical socket is provided on a wall of the housing for engagement with a complementary coupling on the base structure, the control unit being in electrically conductive communication with the electrical socket.

22. A tile assembly as claimed in claim 1, wherein the flow passages comprise elongated slots which extend at an angle to a direction of flow of a fluid over the fluid washed surface.

23. A tile assembly as claimed in claim 1, wherein the flow passages are substantially circular or oval in cross section, and have a central axis that is not parallel with the fluid washed surface of the wall.

24. A tile assembly as claimed in claim 23 wherein at least some of the central axes of the flow passages are parallel with one another.

25. A tile assembly as claimed in claim 23 wherein not all of the central axes of the flow passages are parallel to one another.

26. A structure having a fluid washed surface, said structure comprising:
- a base structure; and
- a tile assembly, fitted to the base structure so as to form at least part of a fluid washed surface, said tile structure including:
  - a housing;
  - at least one plenum provided within an interior of the housing;
  - a wall of the housing having an interior side exposed to said plenum and an outer surface forming at least part of the fluid washed surface, the wall being provided with a plurality of flow passages extending from the interior side of the wall to the outer surface of the wall; and
  - a plurality of flow passage closures operable to open and close at least some of the flow passages.

27. A structure as claimed in claim 26 wherein the base structure is fitted with more than one tile assembly, and the structure further includes:
- a primary fluid supply configured for supplying fluid to the plenum of each tile assembly; and
- a secondary fluid supply configured for the supplying additional fluid to the plenum.

28. A structure as claimed in claim 26, wherein the tile assembly is located in a leading edge region of the base structure.

29. A structure as claimed in claim 26, wherein the base structure comprises at least part of:
- an aircraft wing structure and/or aircraft fuselage.

30. A structure as claimed in claim 26, wherein the structure is an active flow control system.

31. A structure as claimed in claim 26, wherein the structure is a wing structure.

32. A structure as claimed in claim 26, wherein the structure is an aircraft body.

33. A structure as claimed in claim 26, wherein the base structure comprises at least part of:
- an outer hull of a water based vehicle such as a ship or submarine; or
- a fluid flow duct.

* * * * *